Nov. 24, 1970  H. J. HAMJIAN ET AL  3,542,931
CONSUMABLE ELECTRODE MELTING PROCESS
Filed June 9, 1969                                    2 Sheets-Sheet 2
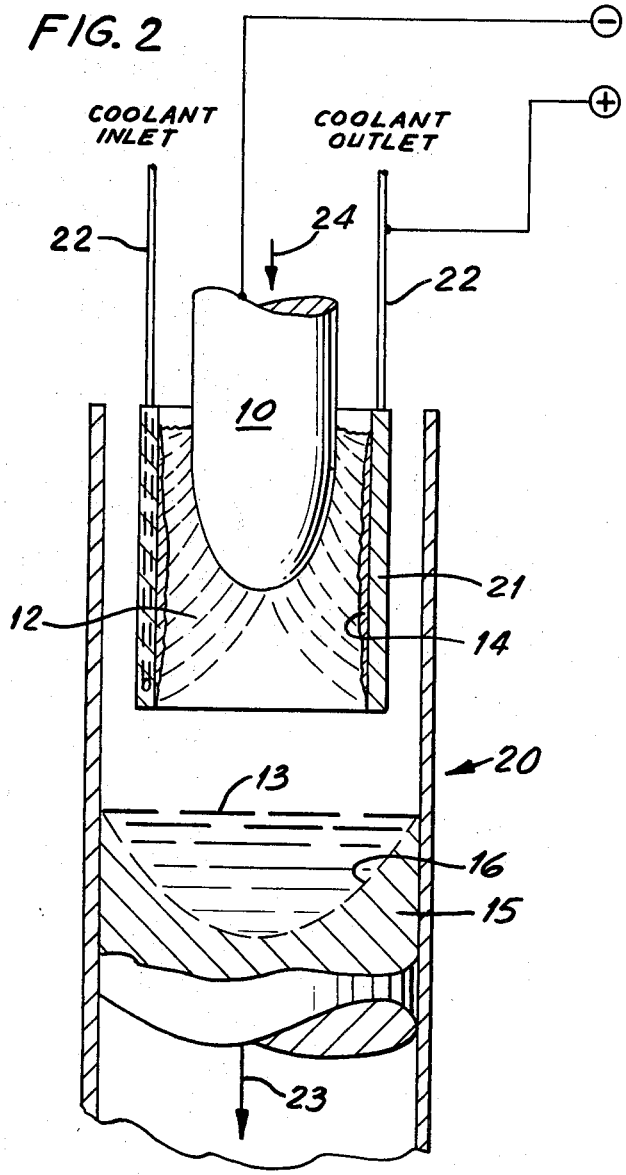
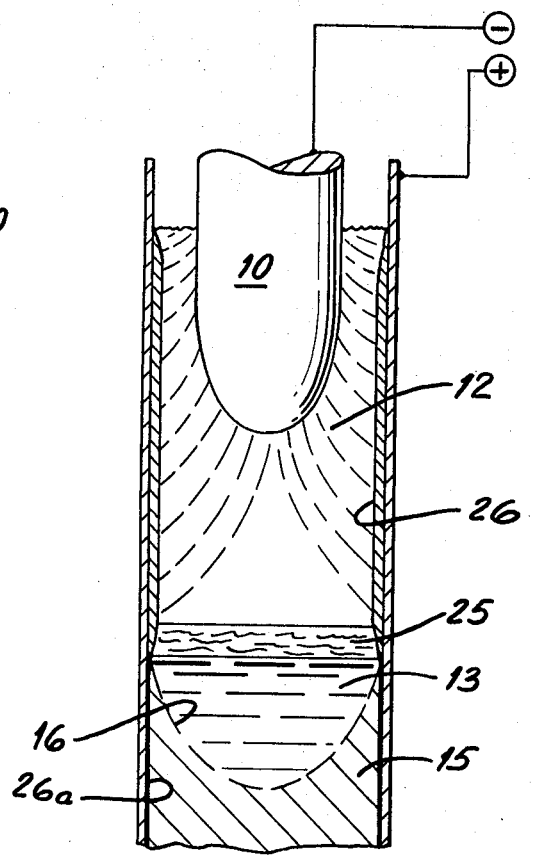

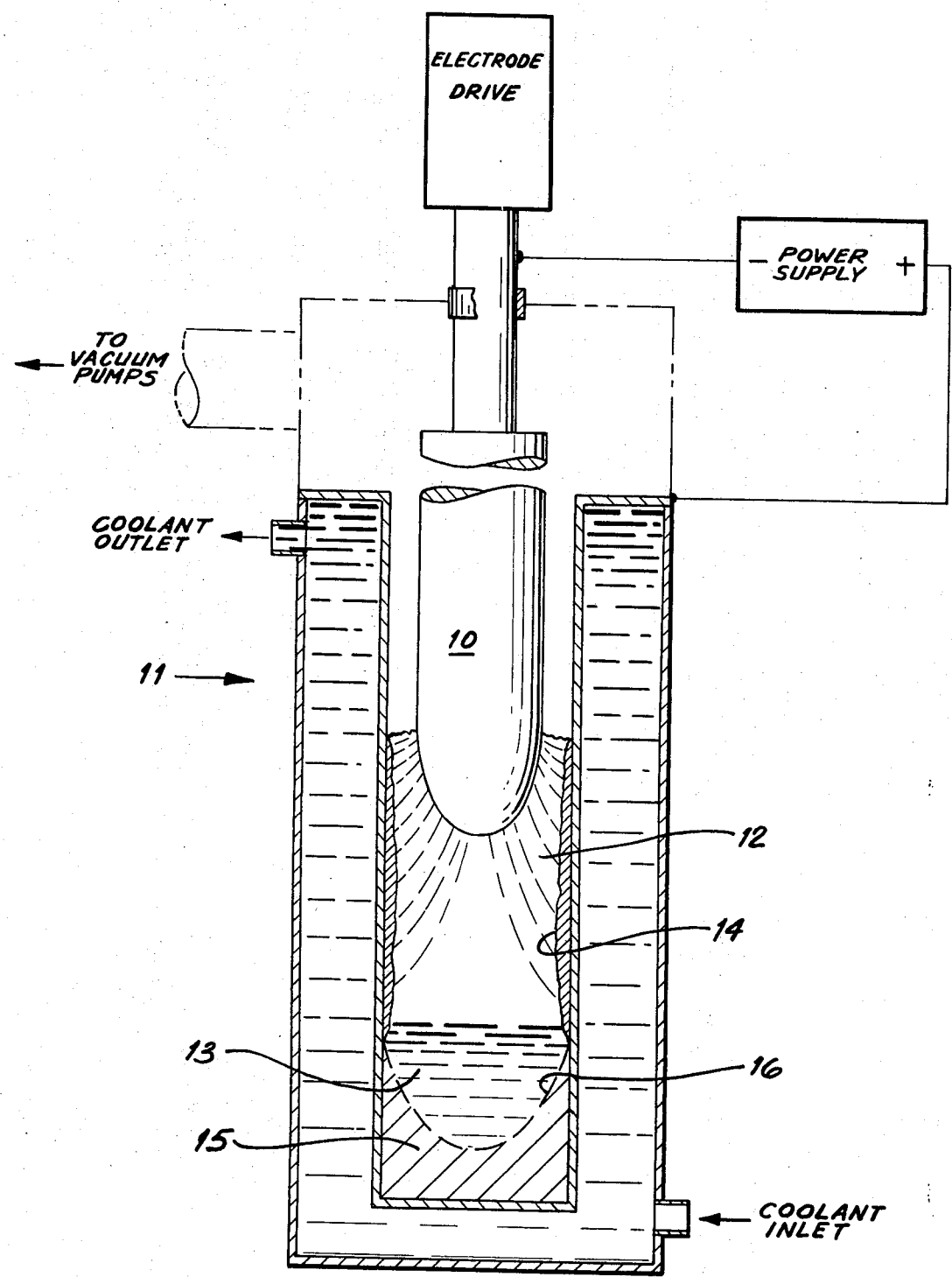

United States Patent Office 3,542,931
Patented Nov. 24, 1970

3,542,931
CONSUMABLE ELECTRODE MELTING PROCESS
Harry J. Hamjian, Greenfields, Reading, and Thomas P. Farr, Mohrsville, Pa., assignors to Carpenter Technology Corporation, Reading, Pa., a corporation of Delaware
Filed June 9, 1969, Ser. No. 831,317
Int. Cl. H05b 7/18
U.S. Cl. 13—9          13 Claims

ABSTRACT OF THE DISCLOSURE

A consumable electrode melting process in which the consumable electrode is melted by a diffuse electric space discharge between the consumable electrode and a counter electrode which can be the wall of the melting chamber with little, preferably none, of the discharge going to the molten metal pool.

---

This invention relates to a process for refining metals and more particularly to such a process in which the metal in the form of a consumable electrode is melted under vacuum pressure conditions by means of an electric space discharge.

Consumable electrode melting techniques have long been used in the production of refined ingots of both pure metals and metal alloys. Usually in carrying out the process, a cylindrical electrode is formed having an analysis similar to that wanted in the final product. The electrode is used as an electrical conductor from which an arc is initiated to the bottom of the crucible or to additional metal placed there for that purpose. The electrode, the ingot being formed, and the electric arc between them are all contained in a water-cooled crucible or melting chamber from which the air has been removed. The heat of the electric arc melts the end of the electrode presented toward the bottom of the crucible, and eventually it is completely consumed. Drops of molten metal fall from the electrode tip, through the arc zone to replenish a pool of molten metal floating on top of the ingot being formed by the solidification of metal from the pool.

Normally, the diameter of the crucible in which the ingot is solidifying is greater than that of the electrode which is being melted by the arc to form the ingot. Consequently, as melting progresses, the height of the ingot increases and the molten pool supported on it rises at a slower rate than that at which the melting end of the electrode recedes from the surface of the molten metal pool. Hitherto, for the electrode tip to recede from the pool had been considered to be highly objectionable not only because in the case of many alloys it resulted in a poor, if not useless, product as a result of variations in the melting rate and concomitant variations in the thermal conditions of the melting process, but also because it was likely to result in destruction of the crucible with risk of injury to personnel.

Various equipments have been developed and are now in use for the purpose of maintaining within close limits a short arc gap between the end face of the electrode and the surface of the molten pool to prevent the arc from jumping from the molten pool to the wall of the crucible. Most of such equipment control the arc gap length, that is the distance from the end of the electrode to the molten metal pool, by sensing and responding to variations in arc voltage or arc current or both that accompany changes in the arc gap so as to maintain the arc gap substantially constant thereby minimizing thermal fluctuations during the melting process. Some equipment monitor the very large and rapid fluctuations that occur when molten metal bridges the gap to cause partial short circuits called drip shorts, although some partial short circuits of the arc may also be the result of waves or splashes of molten metal in the pool which bridge the gap.

Though the vacuum arc consumable electrode process as hitherto practiced is highly successful commercially, it nevertheless has a number of serious drawbacks. Expensive and relatively complex electrode feed and control means are required to maintain the desired short arc gap between the bottom end of the electrode and the surface of the molten metal pool. The close juxtaposition of the electrode to the surface of the pool resulted in the formation of a relatively high pressure region between them as compared to the pressure measured at the outlet to the furnace, the difference in pressure being as great as 10 to 100 times or more. The agitation of the molten metal pool by the electric arc tends to interfere with the manner in which the metal solidifies. The molten metal falling as drops from the consumable electrode through the arc, though only for a short distance, is further heated as is also the surface of the molten pool, and such superheating results in the need to transfer more heat across the liquid-solid metal interface.

We have now discovered that, contrary to previous experience, ingots metallurgically sound in structure can be melted from consumable electrodes by means of an electric space discharge extending between the consumable electrode and a counter electrode, which can be the wall of the melting chamber, with little, preferably none, of the discharge going to the molten metal pool, so long as the distance between the surface of the molten metal pool and the portion of the electrode exposed to the discharge is at least substantially equal to the diameter of the counter electrode, and there is no magnetic field in the zone of the discharge strong enough to result in disruption of the diffuse discharge characteristic of the present process so that it becomes a concentrated, visible arc discharge.

Advantages of our process include significantly faster production rates of a given product as compared to the time required to produce it by conventional consumable electrode vacuum arc melting, for a given crucible outlet pressure a much lower pressure than hitherto is maintained directly over the molten metal pool, a considerably simplified electrode feed control system and electrode to pool distance control can be used because in this process the electric space discharge gap is primarily, preferably entirely, between the electrode and the counter electrode which can be the crucible, the molten metal pool is not subjected to the turbulence or the heat of the arc characteristic of the conventional process, and metal drops from the electrode are no longer heated by the arc as they fall into the pool.

Further objects and advantages of the present invention will be apparent from the following detailed description thereof and the accompanying drawings in which FIG. 1 is a diagrammatic view illustrating the process of the present invention with the diffuse electric space discharge extending between the consumable electrode and the wall of the melting chamber formed by a water-cooled crucible;

FIG. 2 is a similar view of modified apparatus for carrying out the present process; and FIG. 3 is a similar view illustrating the use of a flux on the surface of the molten metal pool.

In carrying out the process of the present invention, the consumable electrodes to be used are produced in the same manner as hitherto. The process can be carried out using conventional consumable electrode vacuum electric arc melting equipment as is diagrammatically shown in FIG. 1, but it is to be understood, as will be more fully pointed out hereinafter, various modifications can be made to conventional equipment to simplify it and/or adapt it for carrying out the present process more effectively.

The starting procedure of the present process can be the same as in conventional melting. An electrode 10 is mounted in the feed mechanism (not shown), the crucible 11 is sealed, pumped down, and the current is turned on with the bottom end of the electrode against the bottom of the crucible or some starting metal placed in the bottom of the crucible for that purpose. At this time, coolant is circulating through the walls of the crucible. Initially, an arc is struck on the opening of a gap between the bottom end of the electrode 10 and the metal immediately below it; and up to this point, the starting procedure of conventional consumable electrode vacuum arc melting has not been departed from. In the prior practice, the electrode-to-molten metal pool distance (the arc gap of the conventional practice) is controlled to prevent the discharge and the discharge current from leaving the molten pool and going to the crucible to any appreciable extent. In carrying out our process, at least a substantial part of the discharge is shifted from the molten metal that is formed on start-up and is prevented from returning to it during the remainder of the process. When the process is being carried out in a conventional crucible with conventional control equipment, this can be accomplished by raising the electrode to increase the electrode-pool gap distance or the electrode can be held stationary so that the discharge melts the tip of the electrode back away from the pool. If desired, raising the electrode and melting the tip away with the discharge can be combined to establish the desired electrode-pool gap.

As the electrode-pool distance increases, the operating voltage is seen to rise and initially the voltage increases at about 1 volt per inch of increase in the arc gap. As the distance is increased from that conventionally used of about one inch, the number of short duration short circuits resulting from molten metal bridging the electrode-pool gap is reduced to zero, and this seems to occur when the gap is equal to about two to three inches. It also can be observed that as the arc gap increases, the voltage becomes less and less affected by changes in the electrode-to-pool distance and becomes more and more dependent upon the electrode and crucible geometry and upon the amount of current in the discharge. More specifically, as the distance between the electrode and the molten pool is increased and other things including the current remain constant, the discharge voltage becomes more and more a function of the ratio of the interior diameter of the crucible to the diameter of the electrode. The voltage is believed to asymptotically approach a value determined by that ratio, and further increases in the electrode-to-pool distance do not affect the discharge voltage.

The increasing discharge voltage in response to increasing electrode-to-pool distance reflects more and more of the discharge current passing between the electrode and crucible and not the molten pool. When the voltage becomes independent of further increases in the electrode-to-pool distance, it is evident that essentially all the current of the discharge as indicated at 12 passes directly between the electrode and the crucible and virtually none passes through the molten pool. As a practical matter, that condition will usually be present when the electrode-to-pool distance is at least equal to the diameter of the crucible but it can be present at somewhat closer spacings as can be readily determined by measuring the electrode-to-pool distance that is present when the discharge voltage is no longer affected by increases in that distance. Such a measurement can be carried out by noting the distance through which the electrode must be fed downward to contact the molten pool and short circuit or extinguish the discharge.

The increase in voltage that is experienced as the result only of increasing the electrode-to-pool distance to the point where further increase has no effect on the voltage is dependent upon the crucible and electrode geometry. In the case of a crucible having an interior diameter of 8 inches and a consumable electrode of 4 inches, conventional vacuum arc melting was carried out at a voltage of about 24.5 to 25.5 volts with a current of 2,500 amperes. The same current was passed at about 28.5 volts with the electrode-to-pool distance increased to where further increases did not affect the discharge voltage. At relatively light current loads, the rise is no more than a few volts. When the current was increased to 5,000 amperes, the voltage rose from 28.5 volts to 37.5 volts.

With a crucible having an interior diameter of 14 inches and a consumable electrode 9 inches in diameter, conventional vacuum arc melting was carried out at about 24 volts with a current of about 5,000 amperes. When the distance between the electrode and pool was increased until further changes did not affect the voltage, and with the current at about 9,000 amperes, the voltage was equal to about 40 volts.

The aforementioned values of current and voltage were obtained at pressures, measured near the crucible outlet, of about 1–10 microns of mercury. However, it is to be noted that the pressure and composition of the atmosphere are not believed to be critical. The process can be carried out at a pressure of 1–500 microns of mercury and at lower and higher pressure if that should be desirable. At the higher pressures, a more suitable atmosphere than air, such as argon or other gases and mixtures thereof which are not undesirably reactive with the metal, is provided. Increasing the pressure above about 1 mm. of mercury to about 10 mm. of mercury, thereby causing an increase in the discharge voltage of about 10 to 20 volts, can provide a hotter discharge in the zone where metallic vapors can otherwise condense on the surface of the counter electrode, and can be used to prevent such condensation or to remelt it if that should be desired. For this purpose, a pressure no more than about 5 mm. of mercury is preferred, although a pressure of up to about 8 to 10 mm. of mercury can be used. However, above about 10 mm. of mercury, it becomes difficult to maintain the stable diffuse discharge of the present process.

When carrying out the present process in conventional upright equipment with the consumable electrode positioned vertically, a net vertical magnetic field in the discharge space tends to disrupt the quiet, substantially invisible discharge characteristic of this process and causes the formation of what appear to be concentrated arcs emanating from a number of discrete spots distributed circumferentially around the tapered tip of the electrode. Such arcs obscure the view of the molten pool and are accompanied by a haze in the discharge zone. They are usually accompanied by a voltage drop. Because of the large currents used in consumable electrode melting, care should be exercised in locating the current conductors to avoid inducing disturbing magnetic fields in the discharge space. However, when such a field is present, its effect can be eliminated by inducing an equal and opposite field to cancel it out as for example by means of an external electromagnetic coil as is well known in this art. While the reasons why such a magnetic field tends to disturb the discharge characteristic of the present invention are not fully understood, its presence can be readily detected by its effect on the discharge as was noted above. With the short arc gap characteristic of a conventional vacuum arc melting process, the presence of a stray magnetic field can be demonstrated by rotation of the molten pool resulting from interaction of the field and the electric discharge current in the molten pool. And with the pool rotating solely as a result of the interaction of the current and the field, raising the electrode until substantially none of the electric current passes through the pool will cause the pool to stop rotating. Thus, substantial elimination of the current, which in the conventional process flows in the molten pool, renders the latter insensitive to such magnetic fields.

Because the discharge of the present process extends entirely or at least primarily between the side of the consumable electrode and the counter electrode, which can be the crucible, and not, as hitherto, substantially entirely between the end face of the consumable electrode and the close-by surface of the molten metal pool, the discharge is free to and does spread over a much larger surface area of the consumable electrode. When the process stabilizes after start-up, the tip of the electrode is seen to be tapered, and this results in an even greater portion of its surface being involved in the discharge which extends to a corresponding area of the counter electrode. Thus, the discharge of the present process is not a concentrated arc discharge, but is a highly diffuse electric space discharge.

From a consideration of the flow of energy in the conventional vacuum arc process, it can be shown that with an electrode-to-pool discharge gap of about 0.75 to 1 inch, close to 100% of the electric arc energy in the form of heat enters the molten pool. Although precise measurement of the portion of that heat entering the molten pool as latent heat in the droplets of metal has not been carried out, calculations based on the measurements that have been made indicate that only about 40% of the arc energy does enter the pool as latent heat in the droplets of metal. In other words, the molten metal pool in such a process receives about 150% more heat energy beyond the amount required only to melt the electrode at the rate being used. In the present process, with substantially all of the discharge current going not to the molten pool 13 but to a counter electrode such as the wall of the crucible 11, substantially the only electric discharge energy that enters the molten pool 13 is that in the form of latent heat in the metal droplets, and the remaining discharge energy goes to the crucible wall where it does no harm because of the large area over which it is distributed. Using as a guide the aforementioned discharge energy distribution of about 40% to the molten pool as latent heat and about 60% to the crucible wall, then in the present process to provide a heat input to the molten pool 13 equal to that of the prior process operating at a given melting rate, the melting rate must be increased to about 2.5 times that of the prior process.

The metallurgical structure of the ingot that is cast from the consumable electrode is determined by such solidification parameters as the molten pool depth and shape, the thermal gradient across the molten pool-solid metal interface, the solidification rate as well as other factors. For example, in the case of the pool depth, if it becomes too deep, the metallurgical structure of the ingot is adversely affected in the case of certain compositions as is well known to those skilled in this art. As a consequence, the need not to exceed a prescribed pool depth then effectively determines the maximum melting rate that can be used and, other things being equal, the permissible rate for the present process is at least about twice that of the prior practice. On the other hand, a too-shallow pool can also adversely affect the metallurgical structure of the ingot as could occur when the present process is operated at the same melting rate as the prior process was required to be operated to provide and maintain a minimum pool depth. Under those conditions, the present process would result in the formation of a relatively shallow pool which in turn would result in an inadequate time for diffusion and other transport processes to be effective in properly refining the metal before solidification. In that event, the economically desirable faster melting capability of the present process would be required to provide a good quality product.

Thus, in accordance with one embodiment of the present invention, not only is the discharge carried out with the end of the consumable electrode spaced from the surface of the molten metal pool by a distance which is at least substantially equal to the diameter of the counter electrode, but also the current in the discharge is increased to provide a melting rate fast enough to maintain the molten metal pool as the distance between the tip of the electrode and the surface of the pool is increased. And the rate at which the current is increased is controlled to avoid thermal shock to the metal as well as adverse effects on the surface properties and segregation in the metallurgical structure.

When the present process is carried out under a pressure of less than about 1 mm. of mercury in conventional apparatus so that the discharge zone traverses portions of the crucible ahead of the rising metal which solidifies to form the ingot, and the distance between the rising surface of the metal pool and the bottom of the electrode tip is such that substantially all of the discharge current flows between the electrode 10 and the crucible 11, then, as shown in FIG. 1, the metallic vapors which condense on the wall of the crucible 11 along the discharge zone form a relatively long shell 14. Under the conditions stated, the length of the shell 14 will be approximately equal to the distance between the surface of the molten pool 13 and the bottom of the electrode tip plus the distance the discharge extends up along the tapered side of the electrode tip. On solidification, the metal of the shell 14, which has an irregular surface, contracts and pulls a small distance away from the cooled crucible wall 11, leaving a space which acts as a thermal barrier. For best results, the shell 14 should be remelted as the molten pool 13 rises within it to minimize surface porosity and other conditions that may otherwise occur.

When necessary, in some instances this can be accomplished by increasing the melting rate and thereby the depth and temperature of the molten pool 13. On the other hand, if the melting rate cannot be increased to the extent that may be required with a specific composition because, for example, the metallurgical structure desired in the ingot cannot then be attained, the electric discharge and melting of the consumable electrode can be confined to one portion or chamber of the crucible, and casting of the ingot can take place in another as will be more fully described in connection with FIG. 2. In this way, the shell formed along the discharge zone cannot affect the metallurgical structure of the ingot.

Consumable electrode melting both by the process of vacuum electric arc melting as hitherto practiced and by the present diffuse electric discharge process is useful in connection with a very large variety of compositions such as pure elements and also alloys ranging from those containing a relatively small amount to those containing a large amount of alloying elements. Such alloys include the tool steels, the high-strength aging and maraging steels, and the high-temperature steels and nonferrous base alloys. Thus, without intending thereby to limit the present process, it will now be described in connection with the melting of a consumable electrode of A.I.S.I. type No. 685 usually sold under the designation Waspaloy. An electrode of that composition, weighing about 1,820 pounds, having the shape of a sixteen-sided polygon with a diameter of 9 inches measured between opposed flats, and about 91 inches long, was mounted in the usual way in a conventional water-cooled crucible 14 inches in diameter and having a 15,000 ampere power supply regulated to provide constant current.

After the crucible had been sealed and after about 15 minutes of pumping, the pressure measured near the outlet to the pumps was about 10 microns of mercury. A conventional type of electric arc space discharge was initiated by backing the electrode away about one inch from some starting metal at the bottom of the crucible. The arc was struck with a current of 2,000 amperes at about 21 volts which was then immediately increased to 5,000 amperes at about 25 volts. Under those conditions, conventional melting was carried out for about 16 minutes. After about 16 minutes, the consumable electrode was backed off about 18 inches, and the current was increased to 9,000 amperes with an operating voltage of 37 volts. During the next 15 minutes, there was a gradual rise in the operating voltage from 37 volts to 40 volts. After about 30 minutes from start-up, equilibrium was reached. As melting continued, the electrode was fed downward at a rate of from 2 to 2.25 inches for each 10-minute interval. Completion of the melt was evident from a sharp rise in voltage when the surface area of the electrode available for the discharge was rapidly reduced. On termination of the discharge, the distance between the bottom of the electrode and the top of the ingot was 28 inches.

Melting of an ingot weighing about 1,785 pounds was completed in about 178 minutes giving an average overall melting rate of about 600 pounds per hour. However, taking into account that the first 16 minutes were at the lower current of 5,000 amperes, the actual melting rate for most of the melt was at a faster rate. In fact, the last 55 inches of the electrode were found to have been melted at the rate of about 725 pounds per hour.

Upon examination, both the surface of the ingot and the microstructure of a disc cut from a 9-inch square billet forged from the ingot were found to be satisfactory. The carbide distribution of the billet was seen to be similar to that of billets of the same alloy remelted by conventional consumable electrode vacuum arc melting techniques. The significance of this will be more fully appreciated when it is borne in mind that the melting rate utilized for melting Waspaloy consumable electrodes by the conventional vacuum arc process is about 325 pounds per hour.

Turning now to FIG. 2, crucible 20 which can be cooled in the usual way, has a fixed counter electrode 21 mounted therein. As shown, the counter electrode 21 is made of copper for good electrical conductivity and is supported by copper conduits 22 which, in addition to supporting the electrode, also function as bus bars for the electric current and conduits for a suitable coolant such as water. The remaining upper structure of the crucible can be constructed in the known manner including the drive for the consumable electrode 10 and the power supply which is connected between the consumable electrode 10 and the counter electrode 21, the latter preferably being connected to the positive side of the power supply. The counter electrode 21 is preferably electrically insulated from the wall of the crucible so as to minimize the tendency for any of the current of the electric discharge to flow through the molten metal pool. As indicated, a shell 14 like that described in connection with FIG. 1 is shown formed on the surface of counter electrode 21 exposed to the discharge.

The surface of the molten metal pool 13 is maintained at a substantially fixed distance from the bottom of the counter electrode 21 by drawing the solified metal ingot 15 downward as indicated by arrow 23 at a rate substantially equal to the rate at which the interface 16 between the molten metal pool 13 and the solidified metal ingot would otherwise rise while keeping the depth of the molten pool substantially constant. Such arrangements are well known in the art and need not be described here because those details form no part of the present invention.

In carrying out the present process in the apparatus of FIG. 2, the discharge is initiated between the consumable electrode 10 and the counter electrode 21 by first bridging the gap with a suitable starting material such as a relatively fine wire or metal wool preferably having the same composition as that of the consumable electrode 10. When the current is turned on, the starting material is immediately vaporized and the discharge is started. It is, of course, not necessary to back the electrode away at the outset. As the electrode 10 is melted away, it is fed downward. If the rate of feed is too slow, then the voltage rises as less and less of the consumable electrode 10 is juxtaposed to the counter electrode 21. That rise in voltage is used to control the feed of the electrode 10 by initiating a downward stroke of the electrode, as indicated by arrow 24, for the distance required to maintain its tip at about the center of the counter electrode. Such apparatus is also well known to the art and need not be described here.

Except for the manner in which the discharge is initiated and the driving of both the consumable electrode 10 and the ingot 15, the process is carried out in the same manner as has been described. An important advantage of the apparatus shown in FIG. 2 resides in that the molten metal pool 13, the interface 16 and the solidified metal 15 do not rise in the crucible to traverse the electric discharge zone. Consequently, the formation of a solid shell of condensed metal on the surface of the counter electrode 21 cannot interfere with the ingot, and therefore no special steps need be taken to remelt the shell.

The present process lends itself to the melting of consumable electrodes to form ingots or bars having a smaller diameter than the electrode. To this end, the crucible is divided into two chambers, an upper chamber which can be identical to that shown in FIG. 2 down to just below the counter electrode 21, and a lower chamber which is of smaller diameter, but in other respects is the same as the lower portion of the crucible 20. If desired, the consumable electrode can be preformed with a taper to facilitate dripping of molten metal into the smaller diameter lower chamber during the period immediately following start-up when tapering would otherwise be effected by the diffuse discharge.

Yet another technique which can be used in minimizing the formation of condensed metal vapors or their effect, resides in the use of a flux in accordance with a further embodiment of the present invention which provides other important advantages. As shown in FIG. 3, the apparatus for carrying out this embodiment of the process can be the same as was described in connection with FIG. 1. After melting has been initiated and equilibrium reached, flux is added slowly enough not to disrupt the discharge. After the flux has been added, the discharge once again becomes stabilized in about 1 to 2 minutes. The flux is fused on being added and floats on the surface of the molten pool as indicated at 25. While a shell 26 forms on the crucible wall, it is now formed primarily from condensed flux vapor rather than metal. In addition, the flux coates the crucible and the surface of the ingot 15 as indicated at 26A. This has a beneficial effect upon the surface of the ingot being cast in the crucible. By its presence on the surface of the molten pool, the flux also serves to quiet further the molten pool as by dampening the effect of the falling metal droplets.

While the process of the present invention has been described in connection with crucibles which are circular in cross section, it is to be understood that the shape of the electrodes and the equipment used in carrying out the present process may be varied as desired. Consumable electrodes, crucibles and counter electrodes that are non-circular in cross section can be used. In that event when "diameter" is referred to herein, including the claims, the shorter transverse dimension such as the minor axis of an ellipse or the width of a rectangle is intended.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. The method of melting a consumable electrode by means of an electric space discharge about one end portion of the consumable electrode in a melting chamber so that molten metal from said end portion of the electrode forms a molten pool from which the metal solidifies to form an ingot, which includes the steps of maintaining the distance between the surface of said molten metal pool and said electrode larger than the maximum distance at which molten metal can bridge the distance between said consumable electrode and said molten metal pool and at least substantially equal to the minimum distance at which a diffuse electric space discharge can be maintained between said end portion of said consumable electrode and a counter electrode spaced from said molten metal pool with no more than a minor portion of the discharge current passing through said molten metal pool, maintaining said diffuse electric space discharge primarily between said consumable electrode and said counter electrode while at least a major portion of said electrode is consumed, and maintaining magnetic fields in said melting chamber transverse to said electric space discharge less than the minimum required to disrupt said diffuse electric space discharge.

2. The method of claim 1 which includes the steps of maintaining the distance between the surface of said molten metal pool and said consumable electrode at least substantially equal to the diameter of said melting chamber in the zone of the discharge.

3. The method of claim 1 which includes the step of maintaining the distance between the surface of said molten metal pool and said consumable electrode at least substantially equal to a value such that increases in said distances have substantially no effect upon the voltage drop of said electric space discharge.

4. The mehod of claim 1 in which said counter electrode is a portion of the wall of said melting chamber spaced from said molten metal pool.

5. The method of claim 1 in which the pressure in said melting chamber is maintained less than about 10 mm. Hg.

6. The method of claim 5 in which the pressure in said melting chamber is maintained less than about 500 microns Hg.

7. The method of claim 5 in which an atmosphere that is non-reactive with the molten metal is maintained in said melting chamber.

8. The mehod of claim 7 in which said atmosphere is argon.

9. The method of claim 7 in which the pressure is from about 1 mm. Hg to about 5 mm. Hg.

10. The method of claim 1 in which flux is fused on the surface of said molten metal pool, and the consumable electrode is spaced from the surface of said flux.

11. The method of claim 1 which includes the steps of initiating said electric space discharge by withdrawing said end of said consumable electrode from the bottom of said melting chamber, and increasing the current in said electric space discharge as the distance between said consumable electrode and said molten metal pool is increased.

12. The method of claim 11 which includes the step of holding said consumable electrode substantially stationary after the discharge is initiated as the distance between said consumable electrode and said molten metal pool is increased by the melting away of said consumable electrode.

13. The method of claim 11 which includes the step of continuing to withdraw said consumable electrode after the initiation of said discharge at least until the distance between said consumable electrode and said molten metal pool is at least substantially equal to the diameter of said melting chamber.

References Cited
UNITED STATES PATENTS 2,933,954   4/1960   Johnson et al. _____ 219—72 X
3,257,539   6/1966   Kazakov _____ 219—72

BERNARD A. GILHEANY, Primary Examiner

R. N. ENVALL, Jr., Assistant Examiner

U.S. Cl. X.R.

13—31; 219—72; 313—146, 156

UNITED STATES PATENT OFFICE
CERTIFICATE OF CORRECTION

Patent No. 3,542,931          Dated November 24, 1970

Inventor(s) Harry J. Hamjian and Thomas P. Farr

It is certified that error appears in the above-identified patent and that said Letters Patent are hereby corrected as shown below:

Column 7, line 54, for "solified" read -- solidified --
Column 8, line 73, in claim 1, after "molten" insert -- metal --.
Column 9, line 26, in claim 3, for "distances" read -- distance --.
           line 28, in claim 4, for "mehod" read -- method --.
Column 10, line 3, in claim 8, for "mehod" read -- method --.
           line 29, References cited, for "2,933,954" read -- 2,933,594 --.

Signed and sealed this 10th day of December 1974.

(SEAL)
Attest:

McCOY M. GIBSON JR.          C. MARSHALL DANN
Attesting Officer            Commissioner of Patents